(12) United States Patent
Benhase et al.

(10) Patent No.: US 8,762,646 B2
(45) Date of Patent: *Jun. 24, 2014

(54) DESTAGING OF WRITE AHEAD DATA SET TRACKS

(71) Applicant: International Business Machines Corporation, Armonk, NY (US)

(72) Inventors: Michael T. Benhase, Tucson, AZ (US); Lokesh M. Gupta, Tucson, AZ (US); Kenneth W. Todd, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 38 days.

This patent is subject to a terminal disclaimer.

(21) Appl. No.: 13/770,058

(22) Filed: Feb. 19, 2013

(65) Prior Publication Data

US 2013/0166837 A1 Jun. 27, 2013

Related U.S. Application Data

(63) Continuation of application No. 13/116,979, filed on May 26, 2011.

(51) Int. Cl.
*G06F 12/00* (2006.01)
*G06F 13/00* (2006.01)
*G06F 13/28* (2006.01)

(52) U.S. Cl.
USPC ............................................. 711/118; 711/130

(58) Field of Classification Search
USPC ................................................... 711/130, 118
See application file for complete search history.

(56) References Cited

U.S. PATENT DOCUMENTS

| 4,507,751 | A | 3/1985 | Gawlick et al. | |
|---|---|---|---|---|
| 7,844,643 | B2 | 11/2010 | Judd | |
| 8,086,792 | B2* | 12/2011 | Jarvis et al. | 711/113 |
| 2008/0040553 | A1* | 2/2008 | Ash et al. | 711/133 |
| 2008/0091875 | A1 | 4/2008 | Mannenbach et al. | |
| 2009/0216954 | A1 | 8/2009 | Benhase et al. | |
| 2010/0174864 | A1 | 7/2010 | Bar-El et al. | |
| 2012/0079199 | A1* | 3/2012 | Beardsley et al. | 711/118 |
| 2012/0151140 | A1* | 6/2012 | Beardsley et al. | 711/118 |

* cited by examiner

*Primary Examiner* — Michael Alsip
(74) *Attorney, Agent, or Firm* — Griffiths & Seaton PLLC

(57) ABSTRACT

Exemplary methods, computer systems, and computer program products for efficient destaging of a write ahead data set (WADS) track in a volume of a computing storage environment are provided. In one embodiment, the computer environment is configured for preventing destage of a plurality of tracks in cache selected for writing to a storage device. For a track N in a stride Z of the selected plurality of tracks, if the track N is a first WADS track in the stride Z, clearing at least one temporal bit for each track in the cache for the stride Z minus 2 (Z−2), and if the track N is a sequential track, clearing the at least one temporal bit for the track N minus a variable X (N−X).

7 Claims, 5 Drawing Sheets

DESTAGING OF WRITE AHEAD DATA SET TRACKS

CROSS REFERENCE TO RELATED APPLICATIONS

This application is a Continuation of U.S. patent application Ser. No. 13/116,979, filed on May 26, 2011.

FIELD OF THE INVENTION

The present invention relates generally to computers, and more particularly to destaging of write ahead data set (WADS) tracks in a computing storage environment.

DESCRIPTION OF THE RELATED ART

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Computer systems of today offer storage area networks, also referred to as SANs. SANs are dedicated networks that connect one or more systems to storage devices and subsystems. Within the SANs network, Write Ahead Data Set (WADS) tracks may be included. The write-ahead data set (WADS) is a small DASD data set containing a copy of log records reflecting committed operations in the on-line data set OLDS buffers that have not yet been written to the OLDS. WADS space is continually reused after the records it contains are written to the OLDS.

SUMMARY OF THE DESCRIBED EMBODIMENTS

Within computer systems, the Write Ahead Data Set (WADS) tracks may be written in such a manner that progression of the write operation as it proceeds is only possible in a sequential fashion, thereby creating challenges to form a complete track prior to destaging to a storage system. Thus, a need exists for a mechanism to improve efficiency for destaging of tracks, for example, writing to a WADS track prior to destaging in order to form a complete WADS track.

Accordingly, and in view of the foregoing, various exemplary methods, computer systems, and computer program products for efficient destaging of a write ahead data set (WADS) track in a volume of a computing storage environment are provided. In one embodiment, the computer environment is configured for preventing destage of a plurality of tracks in cache selected for writing to a storage device. For a track N in a stride Z of the selected plurality of tracks, if the track N is a first WADS track in the stride Z, clearing at least one temporal bit for each track in the cache for the stride Z minus 2 (Z−2), and if the track N is a sequential track, clearing the at least one temporal bit for the track N minus a variable X (N−X).

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
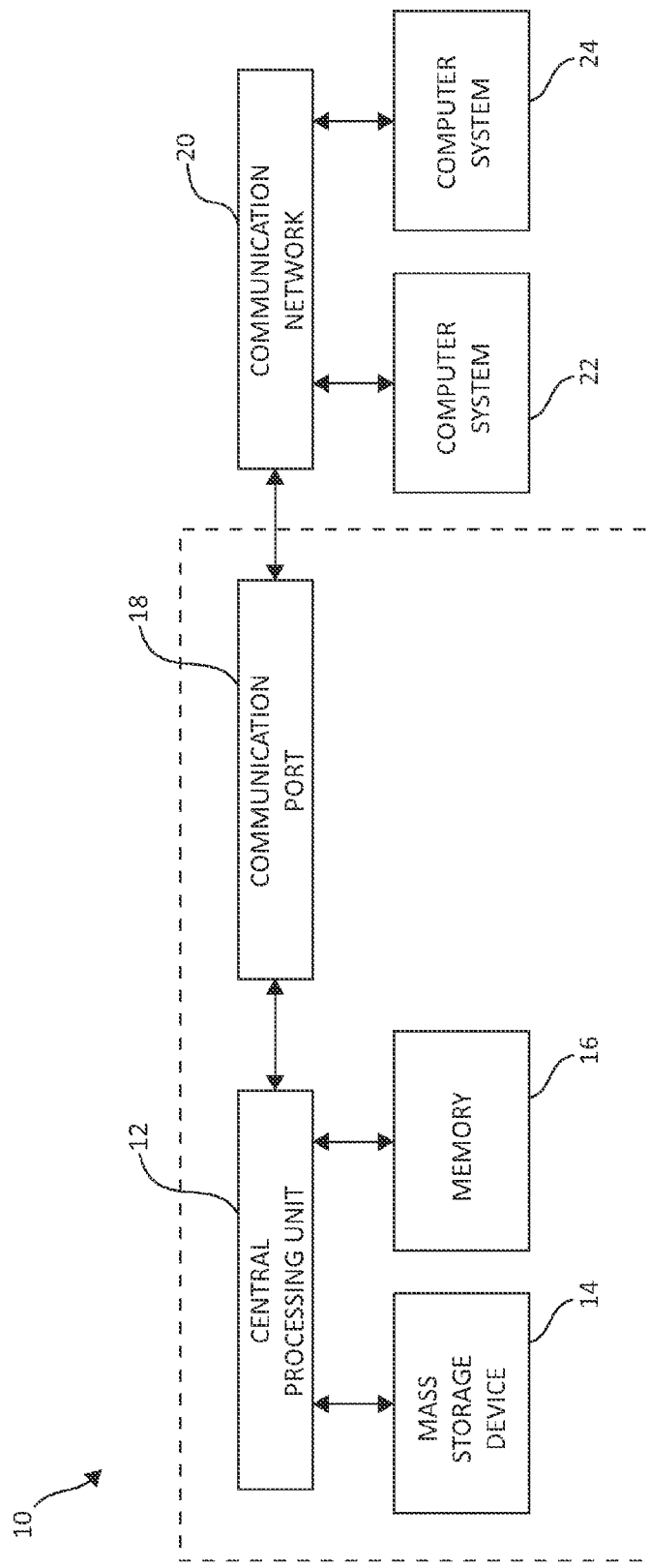
FIG. 1 illustrates an exemplary computing storage environment having a storage device in which aspects of the present invention may be realized.

Throughout the following description and claimed subject matter, the following terminology, pertaining to the illustrated embodiments, is described. The definitions may form a table of suitable of definitions, form matrices for suitable purposes if needed, and for certain terms used herein.

A "temporal bit" is intended herein to include a bit that indicates the track was recently written. It prevents a track from being picked up for destaging.

A "Wise Ordering Writing" is also referred to as "WOW" and is intended herein to include an algorithm that picks a track to destage based on spatial and temporal locality.

A "stride" is intended herein to include a set of tracks for which a RAID array computes parity. Destaging a partial stride causes the RAID controller to utilize more drives since the RAID controller needs to stage and destage the tracks being written and the parity associated with the stride. Full stride destages do not require stage and destage of parity and stage of the tracks that are being destaged.

A write ahead data set (WADS) may be logically organized in groups of tracks. Within each track may be a number of records on each track and the records may be dependent upon the track capacity of the device to which the WADS is allocated. One of the main purposes of WADS is to contain a copy of committed log records that are in on-line data set (OLDS) buffers, but have not yet been written to the OLDS because the OLDS buffer is not yet full.

The mechanisms of the illustrated embodiments provide a solution to avoid destaging conflicts, where a host is writing to a track that is also destaging to a disk and the host writing to the track must wait for the destaging to a disk to be complete. Another objective is to avoid a "raid 5 write penalty" on destaging. If a track is sequential, where all records/blocks of all tracks will eventually be written by a host, a temporal or clock bit may be set on a write of track N (N being a variable representing the track) to prevent destaging until the entire track is written by the host. The mechanisms will reset (zero) the clock bits on a track N minus a variable X (N−X) to indicate it is safe to destage the track N−X. This prevents the destaging conflict. In sequential tracks, the raid 5 penalty is not an issue since sequential tracks eventually the host will write every record/track of the raid 5 stride.

WADS tracks may be written in such a manner that progression of writing occurs in a non-sequential manner. For example, the order of tracks written may be 0, 7, 1, 6, 2, 5, 3, 4, etc., and there may be no guarantee that all the tracks are written. Furthermore, there are limited assurances that all WADS tracks, selected for destaging, will be destaged only after a client/host is finished writing it to the tracks in a stride. Moreover, when the WADS tracks in a stride are selected for destaging, there may be missing sectors and/or tracks from the stride impacting stage performance due to the device adapter having to perform destages.

Because of the order of accessing the WADS track(s) on a volume are not purely sequential, standard sequential handling may not work for the WADS track(s). For example, if a track is a WADS track (where the host only writes some records of some of the tracks), the track N−X approach, as mentioned above, does not necessarily avoid the destaging conflict since the host does not write all of the tracks, e.g., only tracks 1, 2, 7, 8, 9, 13, 14, and 19 being written by the host. If X equals (=) 6, 7 will clear 1, 8 will clear 2, 13 will clear 7, 14 will clear 8. However, track 9 will not be cleared since the host did not write track 15. Since some records and tracks are not written by the host they will not be in cache to group for the full stride destage. Thus, the illustrated embodiments described, following, serve to address the issues described previously by taking advantage of some of the sequentiality and utilize the WADS track access to improve destage performance. In one embodiment, destaging of the WADS tracks is delayed or postponed until the system is confident that the client/host is finished writing to the WADS tracks. Thus, the WADS tracks may be destaged in complete full-track strides.

In one embodiment, a stage (or prestage) may be instituted allowing the mechanism of the illustrated embodiments to fill in sectors missing from tracks in cache along with tracks missing from the stride. In one embodiment, efficiency is improved by performing the prestage by/in a cache rather than using an adapter to perform stages for destages.

In one embodiment, tracks selected for writing/destaging to a storage device may be analyzed in a cache for a determination of the completeness of the tracks/sectors. Mechanisms of the illustrated embodiments continue to write, for example, to incomplete WADS tracks or sectors to form complete WADS tracks. The WADS track(s) are prevented from being destaged until the WADS track(s) are completely full. The complete and full WADS track(s) are written and destaged.

Turning to FIG. 1, an example computer system 10 is depicted which may implement various aspects of the present invention. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
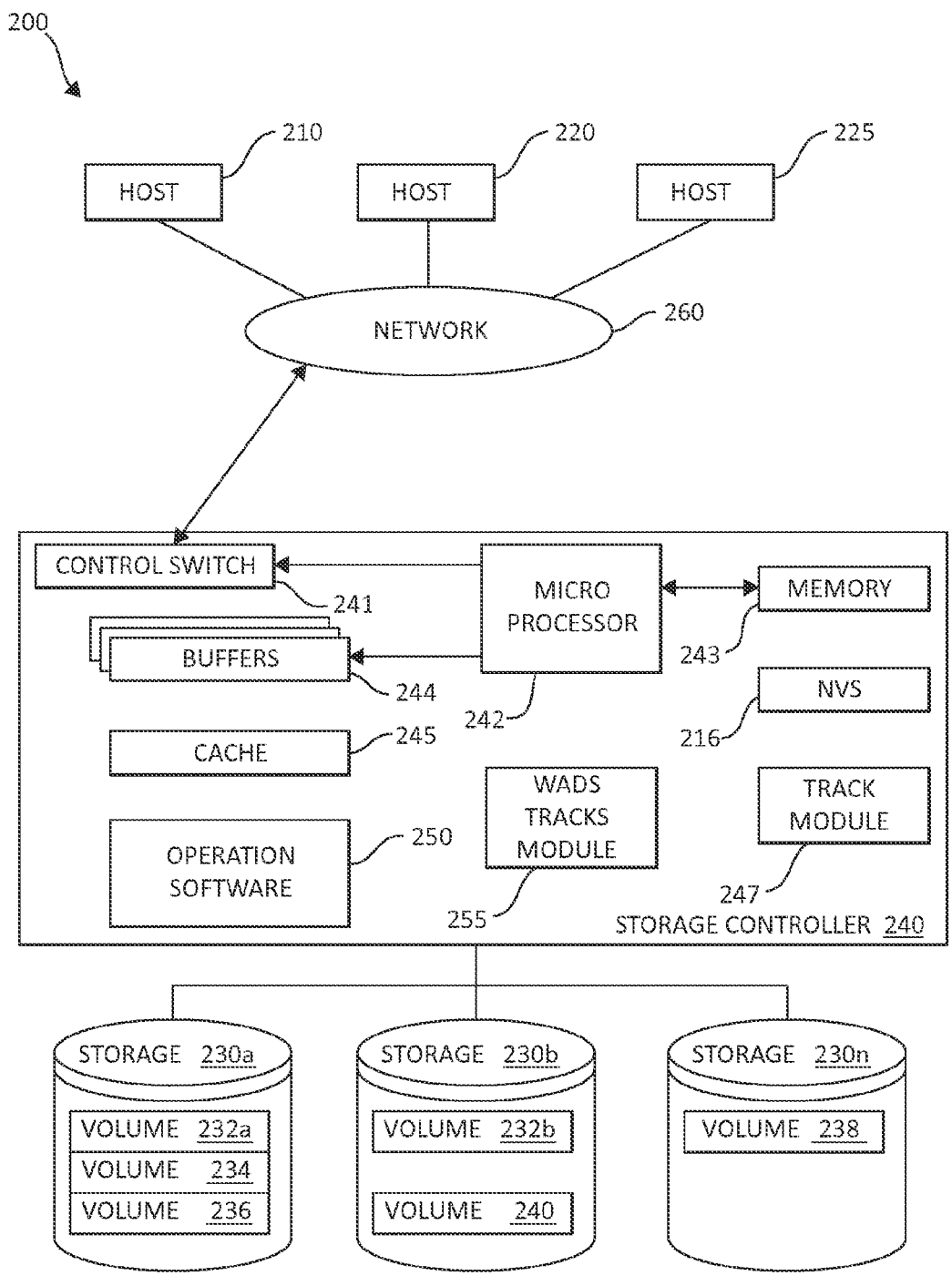
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing the steps and methods of the present invention for efficient destaging of write ahead data set (WADS) track in a volume of a computer storage environment. In one embodiment, system memory 243 includes, is associated, or is in communication with the operation software 250 for executing storage management functions or efficient destaging of write ahead data set (WADS) track in a volume of a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the CACHE 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a WADS tracks module 255 and a track(s) module 247 to assist with efficient destaging of write ahead data set (WADS) track in a volume of a computer storage environment. The WADS tracks module 255 and track(s) module 247 may work in conjunction with each and every component of the storage controller 240, the hosts 210, 220, 225, and storage devices 230. Both the WADS tracks module 255 and track(s) module 247 may be structurally one complete module working together and in conjunction for efficient destaging of write ahead data set (WADS) track in a volume of a computer storage environment or may be individual modules. The WADS tracks module 255 and track(s) module 247 may also be located in the cache 245 or other components of the storage controller 240 to accomplish the purposes of the present invention.

The storage controller 240 is constructed by a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, WADS tracks module, and a track(s) module 247 on which information may be set. Multiple buffers 244 may be implemented with the present invention to assist with the efficient destaging of write ahead data set (WADS) track in a volume of a computer storage environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric". In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, WADS tracks module 255, and track(s) module 247 are in communication with each other and may be separate or one individual component(s). Also, several, if not all of the components, such as the operation software 245 may be included with the memory 243 for efficient destaging of write ahead data set (WADS) track in a volume of a computer storage environment. In one embodiment, by way of example only, each of the components within the storage device may be linked together and may be in communication with each other for purposes suited to the present invention.

Figure 3:
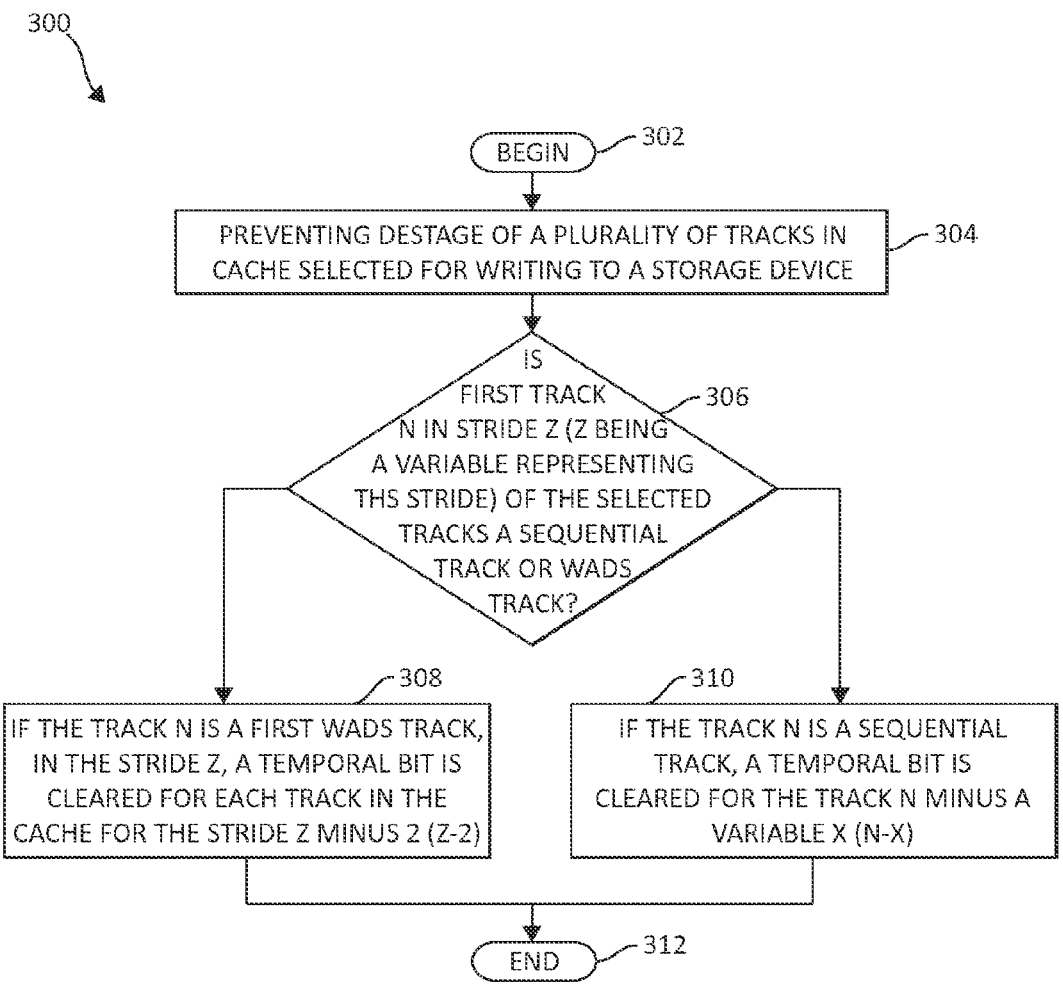
FIG. 3 is a flowchart illustrating an exemplary method of efficient destaging of a WADS track.

FIG. 3 is a flowchart illustrating an exemplary method 300 efficient destaging of a WADS track, in which previously described aspects of the illustrated embodiments are implemented. In one embodiment, the WADS tracks will be prevented from being destaged until we are confident that the client is finished writing them. The WADS tracks will be destaged in complete full-track strides and will require a stage (prestage) to fill in sectors missing from tracks in cache along with tracks missing from the stride. It is may be more efficient for cache to perform a prestage than to have the adapter perform stages for destages. The mechanisms prestages data to the tracks such that a stride Z includes complete tracks, enabling subsequent destage of complete WADS tracks.

This process is described as follows. In one embodiment, the method 300 begins (step 302) by preventing destage of a plurality of tracks in cache selected for writing to a storage device (step 304). The method 300 will check to see if a track N in a stride Z (Z being a variable representing the stride) of the selected plurality of tracks is a WADS track or a sequential track (step 306). If the track N is a first WADS track in the stride Z, clearing at least one temporal bit for each track in the cache for the stride Z minus 2 (Z−2) (step 308) and if the track N is a sequential track, clearing the at least one temporal bit for the track N minus a variable X (N−X) (step 310). The method 300 then ends (step 312).

In one embodiment, the mechanism analyzes the tracks in the cache selected for writing the tracks to a storage device. The tracks are checked to see if they are complete and full. The tracks are checked to see if the client is finished writing them to see if there are sectors or tracks in which or not completely full. The WADS track(s) are prevented from being destaged until the WADS track(s) are complete and full. The complete and full WADS track(s) are written and destaged.

Figure 4:
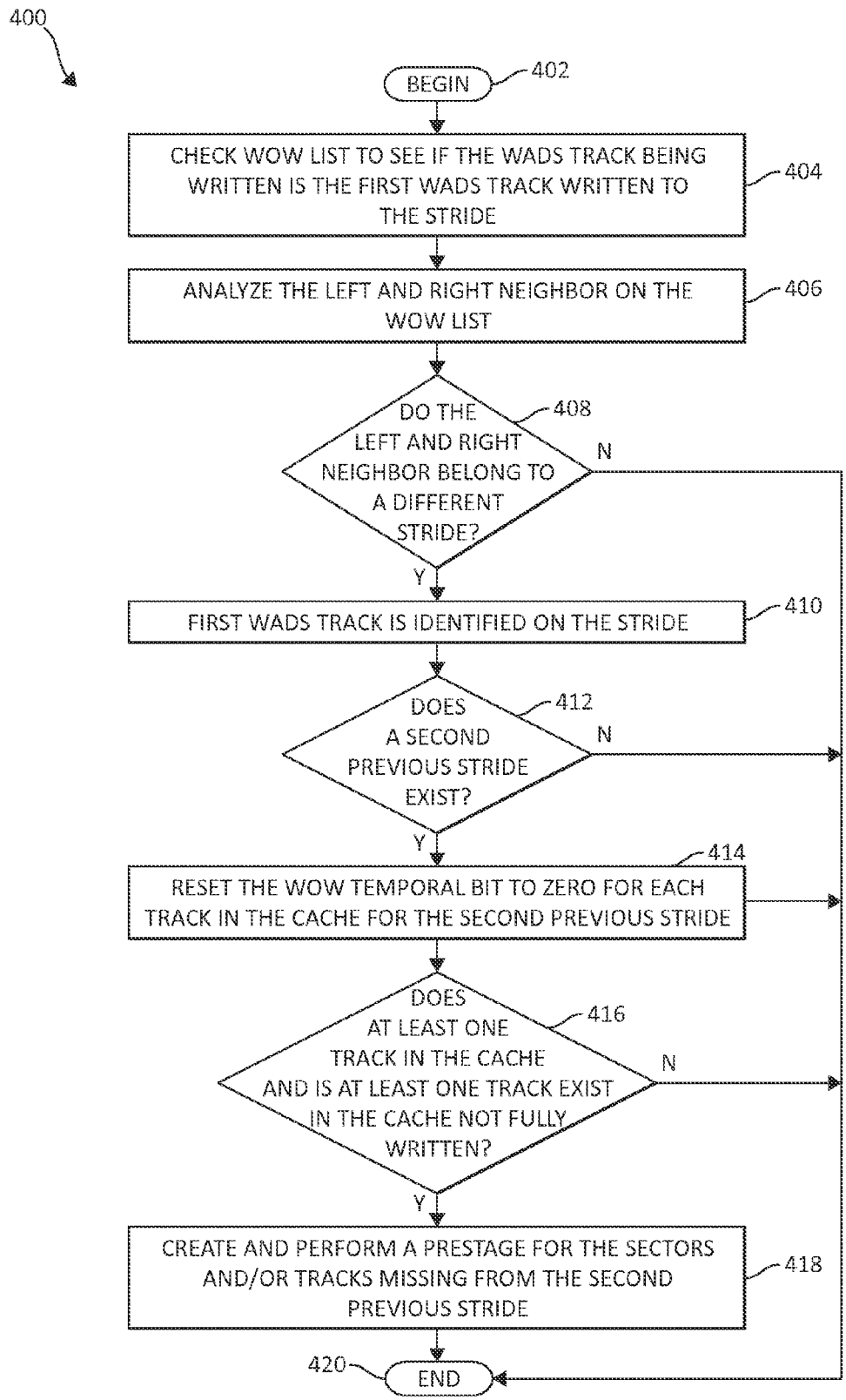
FIG. 4 is a flowchart illustrating an exemplary method for ending access to a WADS track.

FIG. 4 is a flowchart illustrating an exemplary method 400 for ending access to a WADS track. When the write is complete, the mechanisms of the illustrated embodiments, for example the storage controller, may end track access to the WADs track and add the WADS track to non-volatile storage (NVS) or a modified list (WOW list).

In one embodiment, the method 400 begins (step 402) by checking the WOW list to determine if the WADS track being written is the first WADS track written to the stride (step 404). The WOW list is checked by analyzing and looking at the left neighbor and the right neighbor on the WOW list (step 406). The method 400 will determine if the left neighbor and the right neighbor belong to a different stride (the different stride is represented generically as "strideY," wherein Y is a variable representing one or more different strides), (step 408). If not, the method ends (step 420). If both the left neighbor and the right neighbor belong to different strides the WADS track being written is recognized and identified as the first WADS track written to the stride (step 410). If the WADS track is the first WADS track, the method 400 determines if a second previous stride exists (step 412) by checking all the tracks in the stride previous to the previous stride (this being the second previous stride) by traversing the WOW list. For each track in the second stride, the WOW temporal bit is reset to zero for each track in the cache for the second previous stride (step 414). The method will check and determine if at least one track is in cache and/or at least one track in the cache is not a full track (step 416). If at least one track is in cache and at least one track in the cache is not a full track, a prestage is created and performed for the sectors and/or tracks missing from the second previous stride (step 418). The method 400 ends (step 420).

Figure 5:
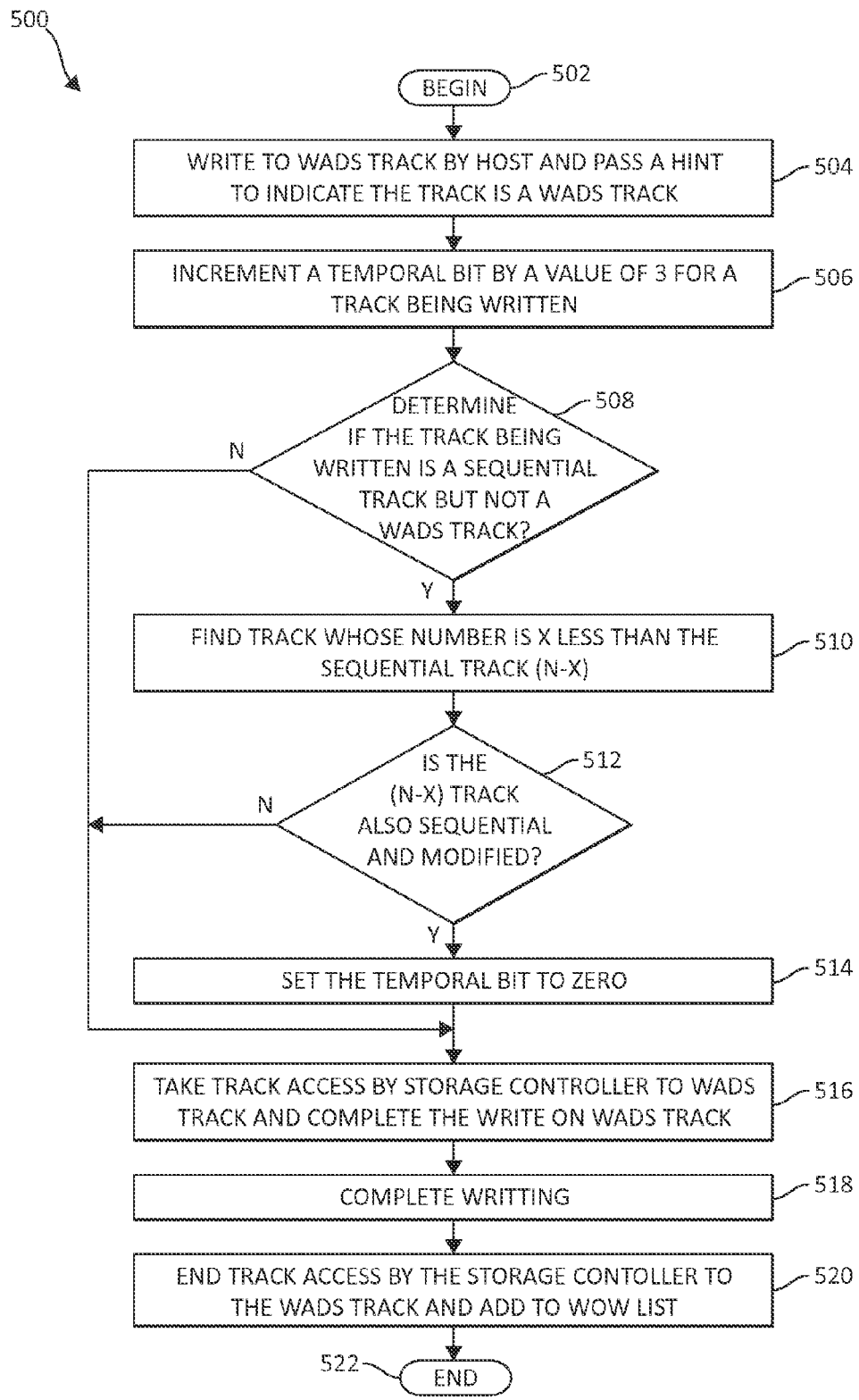
FIG. 5 is a flowchart illustrating an exemplary method for writing to a WADS track prior to destaging.

FIG. 5 is a flowchart illustrating an exemplary method 500 for writing to a WADS track prior to destaging. In one embodiment, the mechanisms of the illustrated embodiments, for example a host/client write to the WADS track as part of a write operation and the host may pass a hint that the track is a WADS track. The method 500 begins (step 502) by writing to a WADS track by the host as part of the write and pass a hint by the host that the track is a WADS track (step 504). A temporal bit is incremented by a value of 3 for a track being written (step 506). The temporal bit may be incremented by a different value for the track being written based upon the needs and scope of the present invention and needs and scope of an end user. The method 500 determines if the track being written is a sequential track and not a WADS track (step 508). If no, the method 500 will take track access by the storage controller to the WADS track and complete the write on the WADS track (step 516). If the track being written is a sequential track, the method will find a track whose number N is X less than the sequential track so it will be a N–X track (step 510). X may be an adjustable variable, a value that is configurable in real time, and/or a predetermined variable or value defined by the user or system. The method 500, checks to see if the newly found N–X track is also sequential and modified (step 512). If no, the method 500 will take track access by the storage controller to the WADS track and complete the write on the WADS track (step 516). If the newly found N–X track is also sequential and modified then the temporal bit is set to zero (step 514). The method 500 will take track access by the storage controller to the WADS track and complete the write on the WADS track (step 516). When the writing is complete on the WADS track (step 518), the storage controller ends track access to the WADS track and adds the WADS track to the non-volatile storage modified list (the WOW list) (step 520). The method 500 then ends (step 522).

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficient destaging of a write ahead data set (WADS) track in a volume by a processor device in a computing storage environment, comprising:
    preventing destage of a plurality of tracks in cache selected for writing to a storage device; and
    for a track N in a stride Z of the selected plurality of tracks:
        if the track N is a first WADS track in the stride Z, clearing at least one temporal bit for each track in the cache for the stride Z minus 2 (Z−2), and
        if the track N is a sequential track, clearing the at least one temporal bit for the track N minus a variable X (N−X).

2. The method of claim 1, further including prestaging data to the plurality of tracks such that the stride Z includes complete tracks, enabling subsequent destage of complete WADS tracks.

3. The method of claim 1, further including incrementing the at least one temporal bit.

4. The method of claim 1, further including taking a track access to the WADS track and completing a write operation on the WADS track.

5. The method of claim 1, further including ending a track access to the WADS track upon a completion of a write operation and adding the WADS track to a wise order writing (WOW) list.

6. The method of claim 5, further including checking the WOW list and examining a left neighbor and a right neighbor in the WOW list to determine if the track N is the first WADS track in the stride Z, wherein if both the left neighbor and right neighbor in the WOW list belong to a stride Y the WADS track is determined to be the first WADS track.

7. The method of claim 6, further including, wherein if the WADS track is determined to be the first WADS track, performing at least one of:
    checking at least one track belonging to a second previous stride by traversing the WOW list, and
    resetting a WOW temporal bit to zero for the at least one track in the cache.

* * * * *